United States Patent
Zhang et al.

(10) Patent No.: US 9,891,495 B2
(45) Date of Patent: Feb. 13, 2018

(54) ARRAY SUBSTRATE AND FABRICATING METHOD THEREOF, AND DISPLAY PANEL

(71) Applicants: BOE Technology Group Co., Ltd., Beijing (CN); Hefei BOE Optoelectronics Technology Co., Ltd., Hefei (CN)

(72) Inventors: Ying Zhang, Beijing (CN); Zhi Hou, Beijing (CN); Daeoh Oh, Beijing (CN); Ziheng Yang, Beijing (CN); Yinan Wang, Beijing (CN); Xin Ding, Beijing (CN); Fu Chen, Beijing (CN); Jianhui Liu, Beijing (CN); Rong Shen, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 0 days.

(21) Appl. No.: 15/310,311

(22) PCT Filed: Jan. 22, 2016

(86) PCT No.: PCT/CN2016/071736
§ 371 (c)(1),
(2) Date: Nov. 10, 2016

(87) PCT Pub. No.: WO2017/031941
PCT Pub. Date: Mar. 2, 2017

(65) Prior Publication Data
US 2017/0269410 A1   Sep. 21, 2017

(30) Foreign Application Priority Data
Aug. 27, 2015   (CN) .......................... 2015 1 0536802

(51) Int. Cl.
G02F 1/1368 (2006.01)
G02F 1/1343 (2006.01)
G02F 1/1362 (2006.01)

(52) U.S. Cl.
CPC ........ G02F 1/1368 (2013.01); G02F 1/13439 (2013.01); G02F 1/134363 (2013.01);
(Continued)

(58) Field of Classification Search
None
See application file for complete search history.

(56) References Cited

U.S. PATENT DOCUMENTS

2002/0036742 A1   3/2002   Kimura et al.
2002/0171086 A1*  11/2002  Miyajima ......... G02F 1/136213
                                                      257/72

FOREIGN PATENT DOCUMENTS

| CN | 102012588 A | 4/2011 |
| CN | 103293811 A | 9/2013 |
| CN | 105206619 A | 12/2015 |

OTHER PUBLICATIONS

May 11, 2016—International Search Report and Written Opinion Appn PCT/CN2016/071736 with Eng Tran.

* cited by examiner

*Primary Examiner* — Michelle Mandala
(74) *Attorney, Agent, or Firm* — Banner & Witcoff, Ltd.

(57) ABSTRACT

An array substrate and a fabricating method thereof, and a display panel are provided. The array substrate includes a base substrate and a plurality of pixel units arranged in matrix on the base substrate, wherein, a first electrode groove and a second electrode groove separated from each other are arranged in a region of the base substrate corresponding to one of the pixel units, the first electrode groove and the second electrode groove respectively extending from
(Continued)

an upper surface of the base substrate towards a lower surface of the base substrate; the pixel unit includes a pixel electrode and a common electrode, the pixel electrode being arranged in the first electrode groove, and the common electrode being arranged in the second electrode groove.

20 Claims, 8 Drawing Sheets

(52) U.S. Cl.
CPC ............ *G02F 1/136227* (2013.01); *G02F 2001/136222* (2013.01); *G02F 2201/121* (2013.01); *G02F 2201/123* (2013.01); *G02F 2201/124* (2013.01)

9,891,495 B2

ARRAY SUBSTRATE AND FABRICATING METHOD THEREOF, AND DISPLAY PANEL

The application is a U.S. National Phase Entry of International Application No. PCT/CN2016/071736 filed on Jan. 22, 2016, designating the United States of America and claiming priority to Chinese Patent Application No. 201510536802.9 filed on Aug. 27, 2015. The present application claims priority to and the benefit of the above-identified applications and the above-identified applications are incorporated by reference herein in their entirety.

TECHNICAL FIELD

Embodiments of the present disclosure relate to an array substrate and a fabricating method thereof, and a display panel.

BACKGROUND

A Thin Film Transistor Liquid Crystal Display (TFT-LCD) dominates a current flat-panel display market due to characteristics such as small size, low power consumption, no radiation, relatively low manufacturing cost and so on.

A main structure of the TFT-LCD includes an array substrate and a color filter substrate cell-assembled and a liquid crystal sandwiched therebetween, and a gate line for providing a scanning signal, a data line for providing a data signal and a pixel electrode for forming a pixel point are formed on the array substrate. In order to realize a display function, it is further necessary to arrange a common electrode, and thus the liquid crystal can rotate under action of an electric field formed by the common electrode and the pixel electrode at the time of energizing, so as to control a magnitude of light transmittance, and further realize display.

SUMMARY

An embodiment of the present disclosure provides an array substrate, including a base substrate and a plurality of pixel units arranged in matrix on the base substrate, wherein, a first electrode groove and a second electrode groove separated from each other are arranged in a region of the base substrate corresponding to one of the pixel units, the first electrode groove and the second electrode groove respectively extending from an upper surface of the base substrate towards a lower surface of the base substrate; the pixel unit includes a pixel electrode and a common electrode, the pixel electrode being arranged in the first electrode groove, and the common electrode being arranged in the second electrode groove.

An embodiment of the present disclosure provides a display panel, including the array substrate described above An embodiment of the present disclosure provides a fabricating method of an array substrate, the array substrate comprising a plurality of pixel units arranged in matrix, the method including: forming a first electrode groove and a second electrode groove in a region of a base substrate corresponding to one of the pixel units, the first electrode groove and the second electrode respectively extending in a direction from an upper surface of the base substrate towards a lower surface of the base substrate; and forming a pixel electrode in the first electrode groove, and forming a common electrode in the second electrode groove.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1:
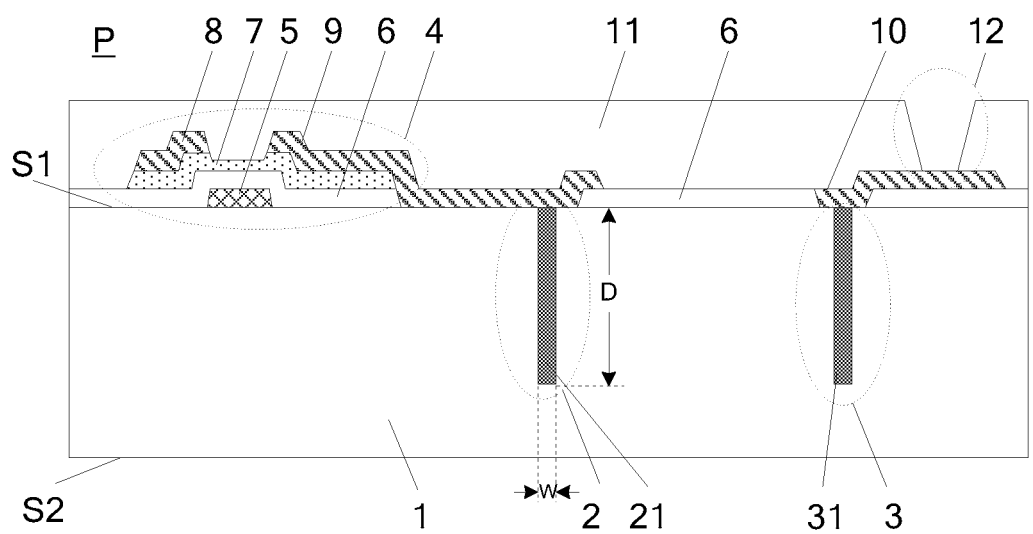
FIG. 1 is a cross-sectional structural schematic diagram of an array substrate provided by a first embodiment of the present disclosure.

Technical solutions of the embodiments of the present disclosure shall be described in detail hereinafter in conjunction with the accompanying drawings of the specification. It should be noted that, same or similar reference signs denote same or similar parts or parts having same or similar functions. It is obvious that the described embodiments are just part of rather than all of the embodiments of the present disclosure. Based on the embodiments in the present disclosure, those skilled in the art can obtain other embodiment(s), without any inventive work, which should be within the scope of the present disclosure.

In an array substrate of a TFT-LCD in a related art, a pixel electrode and a common electrode are formed on an upper surface of a base substrate, which cover almost the entire base substrate, and the pixel electrode and the common electrode are usually made of a semitransparent metal film layer having a certain light-shielding property. The pixel electrode and the common electrode prepared by the semitransparent metal film layer may reduce transmittance of light emitted from a backlight and affect key parameters of the TFT-LCD such as brightness and so on.

Embodiments of the present disclosure provide an array substrate and a fabricating method thereof, and a display panel, capable of solving a problem of low backlight transmittance caused by fabricating the pixel electrode and the common electrode on the upper surface of the base substrate in the array substrate of the related art.

The array substrates of the embodiments of the present disclosure are shown in FIG. 1 to FIG. 4. An array substrate provided by an embodiment of the present disclosure includes a base substrate 1 and a plurality of pixel units P arranged on an upper surface of the base substrate 1. The plurality of pixel units P are defined by a plurality of gate lines and a plurality of data lines intersecting with each other on the base substrate. The plurality of pixel units P is arranged in matrix on the base substrate 1. FIG. 1 to FIG. 4 only exemplarily show one pixel unit P in the array substrate provided by the embodiment of the present disclosure. It can be understood by those skilled in the art that, the other pixel units in the array substrate provided by the embodiment of the present disclosure can have similar or same structures.

The base substrate 1 has an upper surface S1 and a lower surface S2 which are opposite to each other. For example, the upper surface S1 and the lower surface S2 are parallel to each other. Corresponding to each pixel unit, a first electrode groove 2 and a second electrode groove 3 are formed on the upper surface of the base substrate 1, and the first electrode groove 2 and the second electrode groove 3 respectively extend from the upper surface S1 towards the lower surface S2 of the base substrate 1;

The pixel unit P includes a pixel electrode 21 and a common electrode 31 spaced apart from each other. The pixel electrode 21 is arranged in the first electrode groove 2, and the common electrode 31 is arranged in the second electrode groove 3. For example, the pixel electrode 21 fills up the first electrode groove 2, and the common electrode 31 fills up the second electrode groove 3.

In the embodiment, the first electrode groove 2 and the second electrode groove 3 extending inward are formed on the base substrate 1, and the pixel electrode 21 and the common electrode 31 are respectively arranged in the first electrode groove 2 and the second electrode groove 3 of the base substrate 1, so as to extend into the base substrate 1 and have an included angle (for example, the included angle is not equal to 0 degree) with respect to the base substrate 1, which thus reduces shielding of a light-transmitting region in the pixel region, improves backlight transmittance, and reduces influence on brightness of the TFT-LCD.

Figure 2:
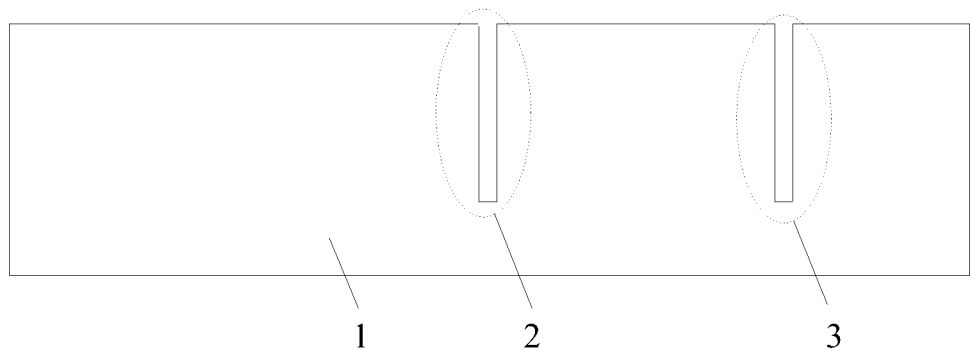
FIG. 2 is a cross-sectional structural schematic diagram of a base substrate of the array substrate provided by the first embodiment of the present disclosure.

According to the concept of the embodiment of the present disclosure, the first electrode groove 2 and the second electrode groove 3 can have a variety of arrangements. For example, as shown in FIG. 1 and FIG. 2, the first electrode groove 2 and the second electrode groove 3 extend in a direction perpendicular to the upper surface S1 of the base substrate 1; and for example, the first electrode groove 2 and the second electrode groove 3 extend to be plate-shaped grooves in a direction perpendicular to a principal plane. That is, each of the first electrode groove 2 and the second electrode groove 3 have two sidewalls which are parallel to each other. Extending surfaces of the first electrode groove 2 and the second electrode groove 3 are parallel to each other. That is, the sidewalls of the first electrode groove 2 and the second electrode groove 3 facing each other are arranged in parallel. In the embodiment, the first electrode groove 2 and the second electrode groove 3 are perpendicular to the upper surface of the base substrate 1, and therefore, the pixel electrode 21 arranged in the first electrode groove 2 and the common electrode 31 arranged in the second electrode groove 3 can minimize shielding of a pixel light-transmitting region. In another aspect, a horizontal electric field is formed between the pixel electrode 21 and the common electrode 31, so that the TFT-LCD realizes a display function.

Figure 3:
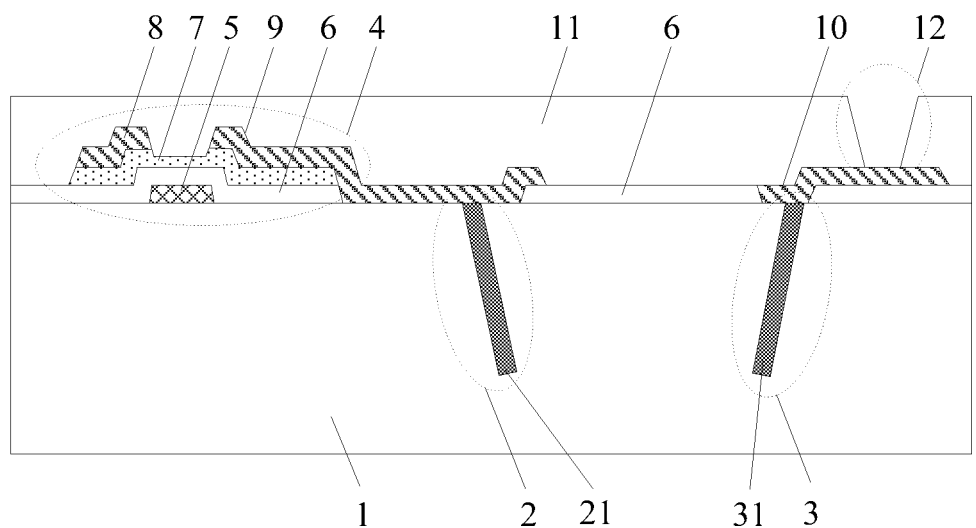
FIG. 3 is a cross-sectional structural schematic diagram of an array substrate provided by a second embodiment of the present disclosure.
Figure 4:
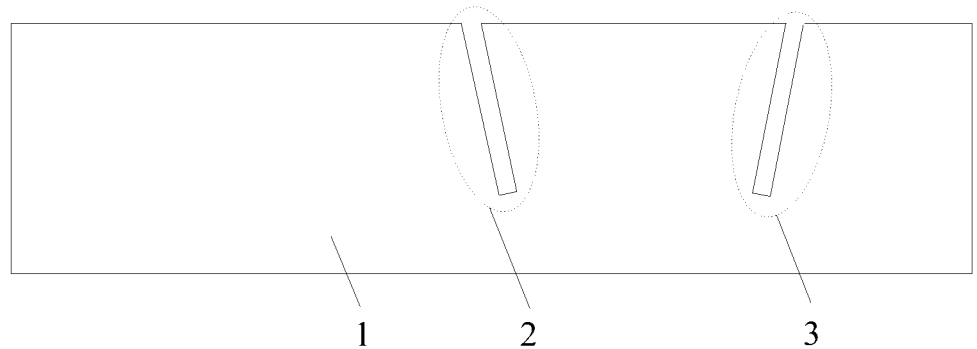
FIG. 4 is a cross-sectional structural schematic diagram of a base substrate of the array substrate provided by the second embodiment of the present disclosure.

For example, as shown in FIG. 3 and FIG. 4, the first electrode groove 2 and the second electrode groove 3 are arranged opposite to each other, and the first electrode groove 2 and the second electrode groove 3 are same in depth; and a transverse distance between the sidewalls of the first electrode groove 2 and the second electrode groove 3 facing each other is reduced with increases of the depths of the first electrode groove 2 and the second electrode groove 3. Here, the transverse distance is a distance in a direction parallel to the upper surface S1. The pixel electrode 21 in the first electrode groove 2 is arranged not perpendicular to the upper surface S1 of the base substrate 1, and the common electrode 31 in the second electrode groove 3 is arranged not perpendicular to the upper surface S1 of the base substrate 1. In the embodiment, an electric field having a certain angle with respect to the base substrate 1 is formed between the pixel electrode 21 in the first electrode groove 2 and the common electrode 31 in the second electrode groove 3, so that the TFT-LCD realizes a display function. For example, in the array substrate shown in FIG. 3, an upper edge and a lower edge of the first electrode groove 2 and an upper edge and a lower edge of the second electrode groove 3 are arranged parallel to each other. The upper and lower edges of the first electrode groove 2 and the upper and lower edges of the second electrode groove 3 all extend in a direction perpendicular to the paper plane. A distance between the lower edge of the first electrode groove 2 and the lower edge of the second electrode groove 3 is less than a distance between the upper edge of the first electrode groove 2 and the upper edge of the second electrode groove 3. It should be noted that, the array substrates shown in FIG. 1 and FIG. 3 are only for illustrating the present disclosure, the upper and lower edges of the first electrode groove 2 and the upper and lower edges of the second electrode groove 3 may not be parallel to each other, and therefore, the upper and lower edges of the first electrode groove 2 and the second electrode groove 3 may be arranged flexibly according to actual needs. Here, the upper edge of the first electrode groove 2 and the upper edge of the second electrode groove 3, for example, respectively refer to openings formed by the first electrode groove 2 and the second electrode groove 3 on the upper surface S1; and the lower edge of the first electrode groove 2 and the lower edge of the second electrode groove 3, for example, respectively refer to bottom surfaces of the first electrode groove 2 and the second electrode groove 3 on the upper surface S1.

Optionally, the pixel electrode 21 and the common electrode 31 are planar electrodes or comb-shaped electrodes. In the embodiment, structures of the pixel electrode 21 and the common electrode 31 may be flexibly arranged according to needs, and for example, in a case that a plane where the pixel electrode 21 is located and a plane where the common electrode 31 is located are not perpendicular to the base substrate 1, the shielding of the pixel light-transmitting region may be further reduced. In addition, the pixel electrode 21 and the common electrode 31 may be a metal having high conductivity (e.g., copper, aluminum, alloy material) or a transparent conductive material (e.g., indium tin oxide).

In order to enable an electric field formed between the pixel electrode 21 formed in the first electrode groove 2 and the common electrode 31 formed in the second electrode groove 3 to drive liquid crystal to deflect, the first electrode groove 2 and the second electrode groove 3 may have depths in a range of 1 to 100 µm, for example, may be 10 µm, 20 µm, or 50 µm.

The depth-to-width ratio of the first electrode groove 2 and that of the second electrode groove 3 may be in a range of 5:1 to 50:1, for example, may be 10:1. For example, as shown in FIG. 1, the depth of the first electrode groove 2 is a depth D extending from the upper surface of the base substrate 1 towards the lower surface of the base substrate 1, and the width of the first electrode groove 2 is a width W in a direction parallel to the upper surface S1 of the base substrate 1. The depth and width of the second electrode groove 3 have meanings similar to the depth and width of the first electrode groove 2.

Optionally, the pixel unit P further includes a thin film transistor 4, and the thin film transistor 4 includes a gate electrode 5, a gate insulating layer 6, an active layer 7, a source electrode 8 and a drain electrode 9, and the drain electrode 9 of the thin film transistor 4 is electrically connected with the pixel electrode 21, so as to control turning on and off the thin film transistor 4, further changing a voltage applied to the pixel electrode 21, and realizing display control of the pixel unit of the array substrate.

Optionally, the array substrate further includes a common electrode line 10, and the common electrode line 10 is electrically connected with the common electrode 31 of each pixel unit P.

Optionally, the common electrode line 31 and the source electrode 8 and the drain electrode 9 of the thin film transistor 4 are arranged in a same layer, so that the common electrode line 31, the source electrode 8 and the drain electrode 9 of the thin film transistor 4 may be completed by a single process in preparation.

Optionally, the common electrode line 31 and the gate electrode 5 of the thin film transistor 4 are arranged in a same layer, so that the common electrode line 31 and the gate electrode 5 of the thin film transistor 4 may be completed by a single process in preparation.

For example, a passivation layer 11 may be arranged on the thin film transistor 4, for protecting the thin film transistor 4, and a via hole 12 may be further formed on the passivation layer 11, so that the common electrode line 10 may be connected to the outside through the via hole 12, which will not be repeated here.

In the array substrate provided by the embodiment of the present disclosure, the first electrode groove and the second electrode groove extending inward are formed on the upper surface S1 of the base substrate, so that the pixel electrode and the common electrode are respectively arranged in the first electrode groove and the second electrode groove of the base substrate, so as to extend into the base substrate and have an included angle with respect to the base substrate. In this way, shielding of a pixel light-transmitting region can be reduced, backlight transmittance can be improved, and influence on brightness of the TFT-LCD can be reduced; in addition, since the pixel electrode and the common electrode are arranged in the first electrode groove and the second electrode groove extending inward the base substrate, space above the base substrate is not occupied, so that a thickness of the entire array substrate can be reduced.

An embodiment of the present disclosure further provides a display panel, including the array substrate provided by the above embodiment.

One example of the display device is a liquid crystal display device, wherein, the array substrate is arranged opposite to an counter substrate to form a liquid crystal cell, and the liquid crystal cell is filled with liquid crystal material therein. The counter substrate is, for example, a color filter substrate. A pixel electrode of each pixel unit of the TFT array substrate is used for applying an electric field to control a rotation degree of the liquid crystal material, so as to carry out a display operation. In some examples, the liquid crystal display device further includes a backlight source for providing backlight to the array substrate.

In the display panel provided by the embodiment of the present disclosure, the first electrode groove and the second electrode groove extending inward are formed on the upper surface S1 of the base substrate, and the pixel electrode and the common electrode are respectively arranged in the first electrode groove and the second electrode groove of the base substrate, so as to extend into the base substrate and have an included angle with respect to the base substrate. In this way, shielding of a pixel light-transmitting region can be reduced, backlight transmittance can be improved, and influence on brightness of the TFT-LCD can be reduced.

Figure 5:
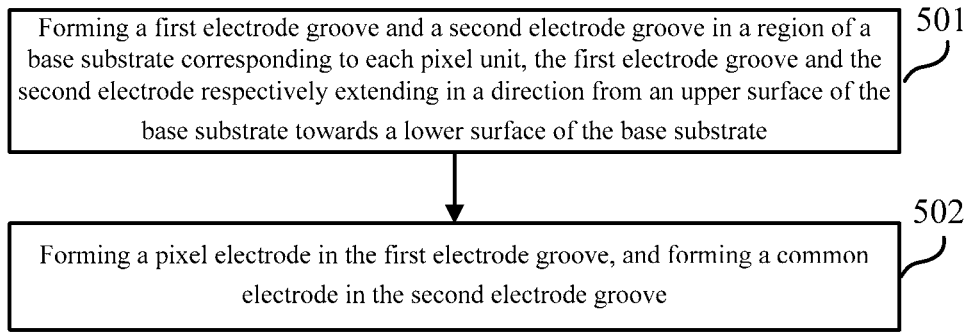
FIG. 5 is a flow chart of a fabricating method of an array substrate provided by an embodiment of the present disclosure.

Referring to FIG. 5, an embodiment of the present disclosure further provides a fabricating method of an array substrate, including:

501: forming a first electrode groove and a second electrode groove in a region of a base substrate corresponding to each pixel unit, the first electrode groove and the second electrode respectively extending in a direction from an upper surface of the base substrate towards a lower surface of the base substrate.

502: forming a pixel electrode in the first electrode groove, and forming a common electrode in the second electrode groove.

Advantages of the embodiment of the present disclosure are as follows: the first electrode groove and the second electrode groove extending inward are formed on the base substrate, and the pixel electrode and the common electrode are respectively arranged in the first electrode groove and the second electrode groove of the base substrate, so as to extend into the base substrate and have an included angle with respect to the base substrate, which thus reduces shielding of a light-transmitting region in the pixel region, improves backlight transmittance, and reduces influence on brightness of the TFT-LCD.

Figure 6:
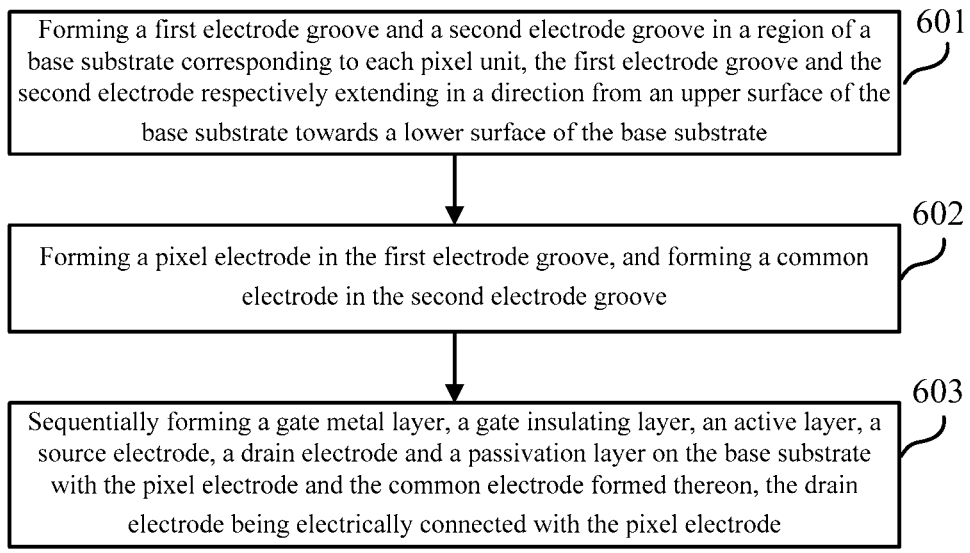
FIG. 6 is a flow chart of a fabricating method of an array substrate provided by an embodiment of the present disclosure.

Referring to FIG. 6, an embodiment of the present disclosure further provides a fabricating method of an array substrate, including:

601: forming a first electrode groove and a second electrode groove in a region of a base substrate corresponding to each pixel unit, the first electrode groove and the second electrode respectively extending in a direction from an upper surface towards a lower surface of the base substrate.

For example, step 601 may include:

forming a mask layer on the base substrate;

forming a photoresist film layer having a predetermined pattern on the mask layer, the predetermined pattern corresponding to the first electrode groove and the second electrode groove to be formed;

transferring the predetermined pattern of the photoresist film layer to the mask layer by a patterning process, and removing the photoresist film layer;

forming the first electrode groove and the second electrode groove on the base substrate by a patterning process, by taking the mask layer having the predetermined pattern as a mask.

602: forming a pixel electrode in the first electrode groove, and forming a common electrode in the second electrode groove.

603: sequentially forming a gate metal layer, a gate insulating layer, an active layer, a source electrode, a drain electrode and a passivation layer on the base substrate with the pixel electrode and the common electrode formed thereon, the drain electrode being electrically connected with the pixel electrode.

The first electrode groove and the second electrode groove extending inward are formed on the base substrate, and the pixel electrode and the common electrode are respectively arranged in the first electrode groove and the second electrode groove of the base substrate, so as to extend into the base substrate and have an included angle with respect to the base substrate, which thus reduces shielding of a light-transmitting region in the pixel region, improves backlight transmittance, and reduces influence on brightness of the TFT-LCD.

Figure 7:
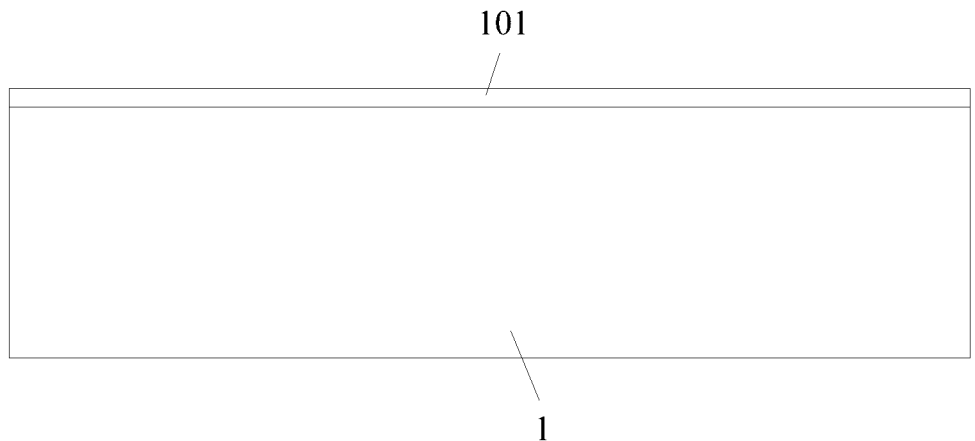
FIG. 7 is a schematic diagram of forming a mask layer on the base substrate in the embodiment of the present disclosure.

In order to more clearly describe the fabricating method of the array substrate in the present disclosure, taking the array substrate shown in FIG. 1 for example, in conjunction with FIGS. 7 to 13, detailed description is made as follows:

Step 1: forming a mask layer 101 on a base substrate 1, as shown in FIG. 7.

For example, on an upper surface S1 of the base substrate 1, a mask layer 101 is formed on a surface of the base substrate 1 by a sputtering process or a plasma enhanced chemical vapor deposition process, wherein an etching selection ratio of a material of the mask layer 101 to a material of the base substrate 1 is relative high.

In the embodiment, the base substrate 1 may be made of SiO2, as long as an etching selection ratio of SiO2 and a material of the mask layer 101 is relative high, for example, the etching selection ratio is not less than 5:1 (≥5:1).

Figure 8:
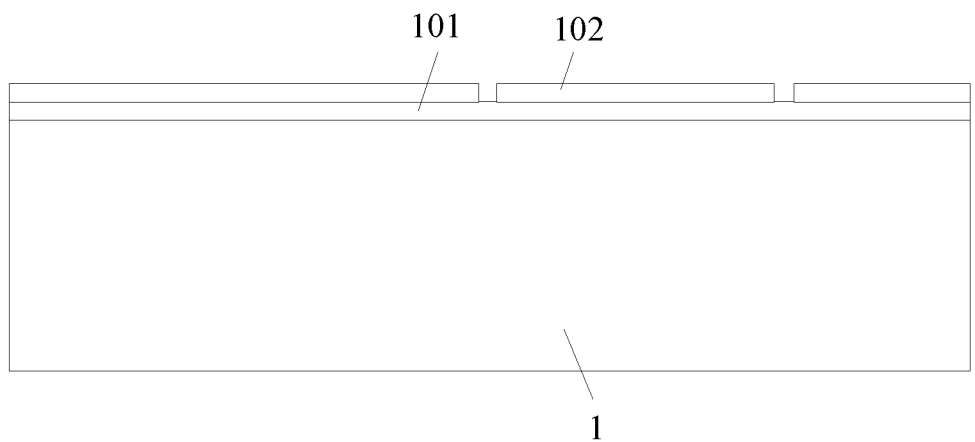
FIG. 8 is a schematic diagram of forming a photoresist film layer on the mask layer in the embodiment of the present disclosure.

Step 2: forming a photoresist film layer 102 on the mask layer 101, as shown in FIG. 8.

For example, projection patterns of the first electrode groove 2 and the second electrode groove 3 may be formed on the photoresist film layer 102 by a patterning process (including exposing, developing and so on).

Figure 9:
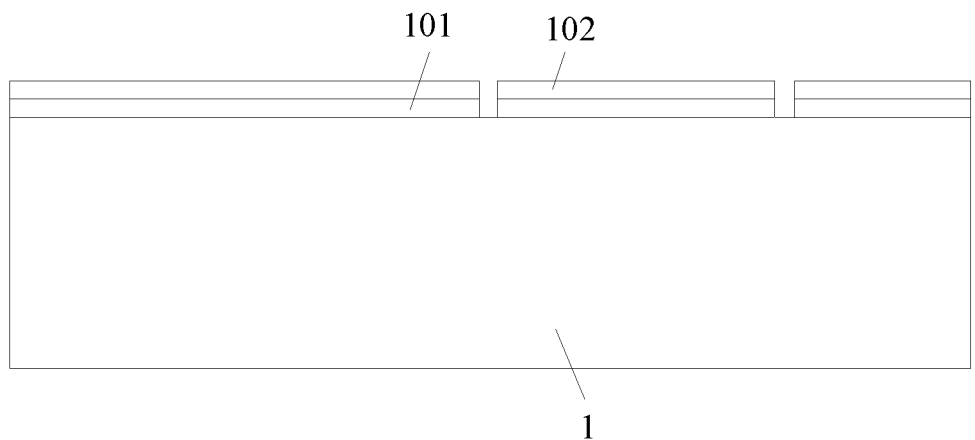
FIG. 9 is a schematic diagram after transferring a pattern of the photoresist film layer to the mask layer in the embodiment of the present disclosure.
Figure 10:
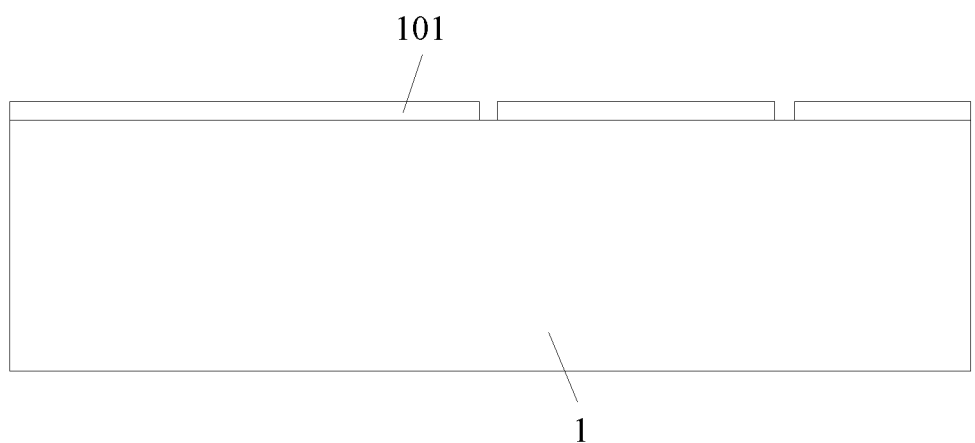
FIG. 10 is a schematic diagram after removing the photoresist film layer in the embodiment of the present disclosure.

Step 3: transferring the pattern of the photoresist film layer 102 to the mask layer 101 by a patterning process, as shown in FIG. 9; then removing the photoresist film layer 102, as shown in FIG. 10.

For example, covering by the photoresist film layer 102, a part of the mask layer 101 which is not covered by the photoresist film layer 102 is etched off, and the pattern of the photoresist film layer 102 is transferred to the mask layer 101, and then the photoresist film layer 102 is removed by a wet etching process.

Figure 11:
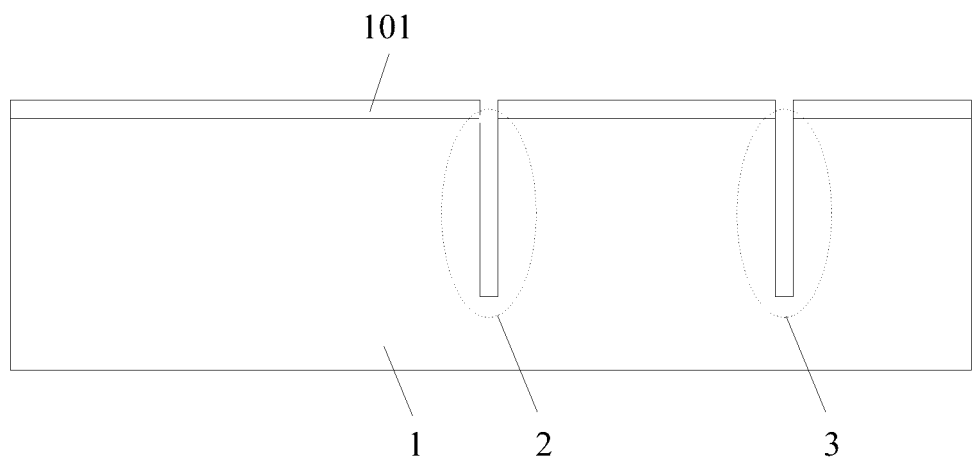
FIG. 11 is a schematic diagram of etching the base substrate by using the mask layer as a mask to form a first electrode groove and a second electrode groove in the embodiment of the present disclosure.
Figure 12:
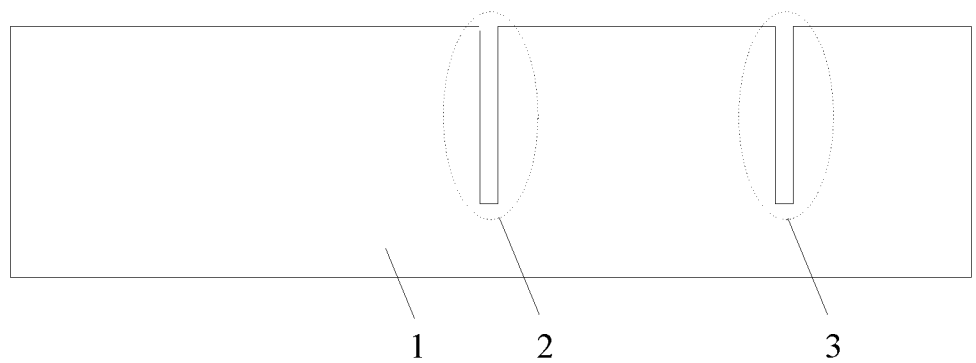
FIG. 12 is a schematic diagram of removing the mask layer in embodiment of the present disclosure.

Step 4: forming the first electrode groove 2 and the second electrode groove 3 on the base substrate 1 by a patterning process, by taking the mask layer 101 as a mask, as shown in FIG. 11; then removing the mask layer 101, as shown in FIG. 12, so as to complete fabrication of the first electrode groove 2 and the second electrode groove 3.

For example, grooves having a certain depth is etched in a region where is not covered by the mask layer 101 by using a dry etching process, that is, the first electrode groove 2 and the second electrode groove 3 are formed, and then the mask layer 101 can be removed by using a dry etching process or a wet etching process.

Figure 13:
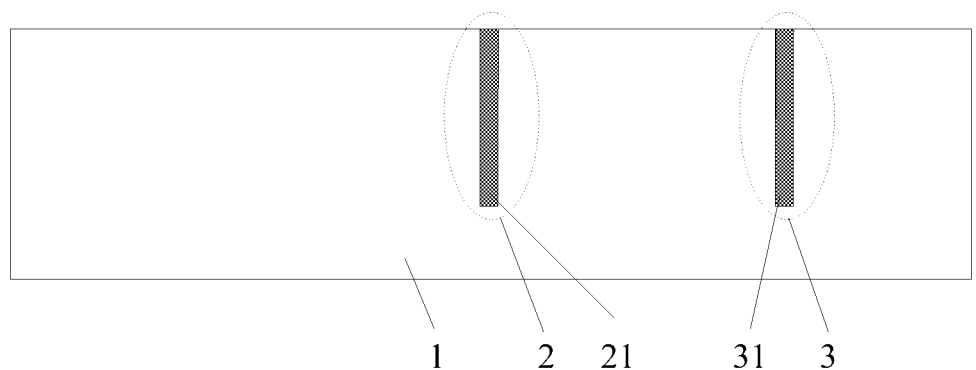
FIG. 13 is a schematic diagram of forming a pixel electrode in the first electrode groove and forming a common electrode in the second electrode groove in embodiment of the present disclosure.

Step 5: forming a pixel electrode 21 in the first electrode groove 2, and forming a common electrode 31 in the second electrode groove 3, as shown in FIG. 13.

For example, an electrode material can be filled into the first electrode groove 2 and the second electrode groove 3 by using a sputtering process or a plasma enhanced chemical vapor deposition process, and then a film layer of the electrode material formed on the upper surface of the base substrate other than the first electrode groove 2 and the second electrode groove 3 in a process of backfilling is etched off by using a dry etching or a wet etching which tends to be an isotropic etching, and an amount of etching should be controlled to be slightly greater than a thickness of a film layer of the electrode materials deposited on the base substrate 1.

The electrode material can be aluminum, copper, indium tin oxide or semiconductor silicon and so on.

In order to enable an electric field formed between the pixel electrode 21 formed in the first electrode groove 2 and the common electrode 31 formed in the second electrode groove 3 to drive liquid crystal to deflect, the first electrode groove 2 and the second electrode groove 3 can have depths in a range of 1 to 100 μm, for example, can be 10 μm, 20 μm, or 50 μm.

A depth-to-width ratio of the first electrode groove 2 and that of the second electrode groove 3 can be in a range of 5:1 to 50:1, for example, can be 10:1. The depths may be understood as depths of the first electrode groove 2 and the second electrode groove 3 extending from the upper surface of the base substrate 1 towards the lower surface of the base substrate 1, and the range of the widths may be understood as widths of the first electrode groove 2 and the second electrode groove 3 along a direction parallel to the upper surface of the base substrate.

Figure 14:
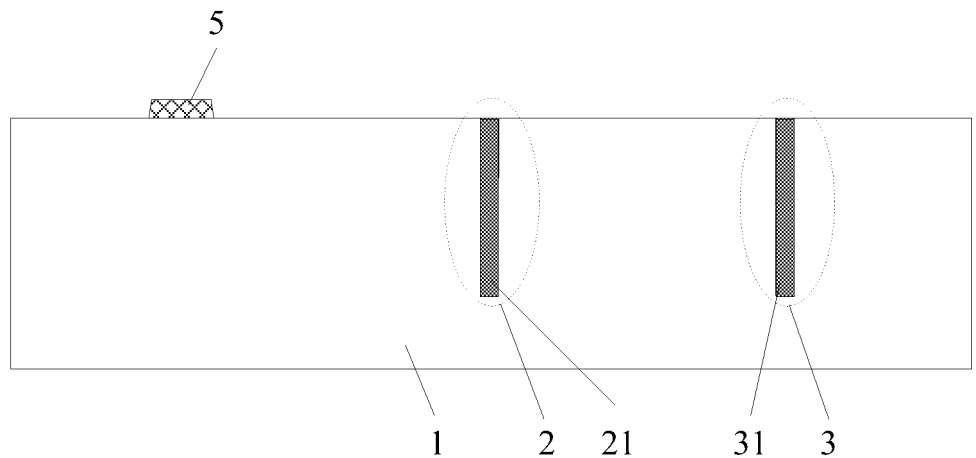
FIG. 14 is a schematic diagram of forming a gate electrode of a thin-film transistor in the embodiment of the present disclosure.

Step 6: forming a gate metal layer including a gate electrode 5 of the thin film transistor 4 (as shown in FIG. 3) on the base substrate 1 where the above steps have been completed, as shown in FIG. 14.

For example, the gate metal layer may be formed by using a sputtering process, and the gate metal layer may be made of a metal such as molybdenum or aluminum and the like.

Figure 15:
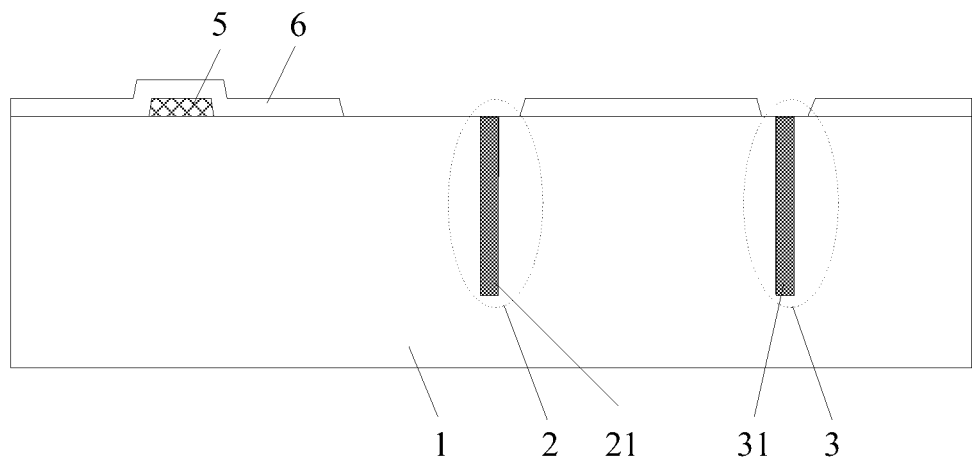
FIG. 15 is a schematic diagram of forming a gate insulating layer in the embodiment of the present disclosure.

Step 7: forming a gate insulating layer 6 on the gate metal layer, as shown in FIG. 15.

For example, the gate insulation layer 6 may be formed by using a plasma enhanced chemical vapor deposition process, and the gate insulating layer 6 may be made of SiO2 or silicon nitride.

Figure 16:
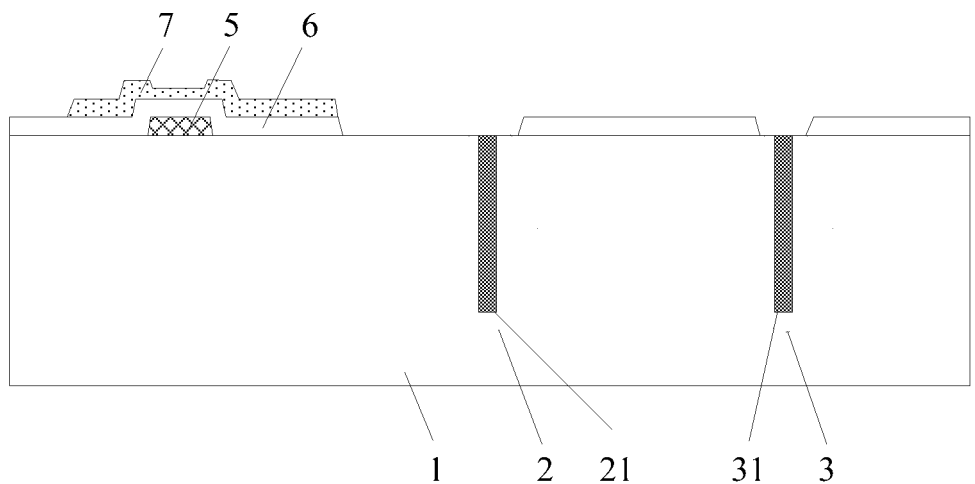
FIG. 16 is a schematic diagram of forming an active layer in the embodiment of the present disclosure.

Step 8: forming an active layer 7 of the thin film transistor 4 on the gate insulating layer 6, as shown in FIG. 16.

For example, the active layer 7 may be formed by using a plasma enhanced chemical vapor deposition process, and the active layer may include a semiconductor and a doped semiconductor, and a conductive groove of the thin film transistor 4 is formed between the source electrode and the drain electrode.

Figure 17:
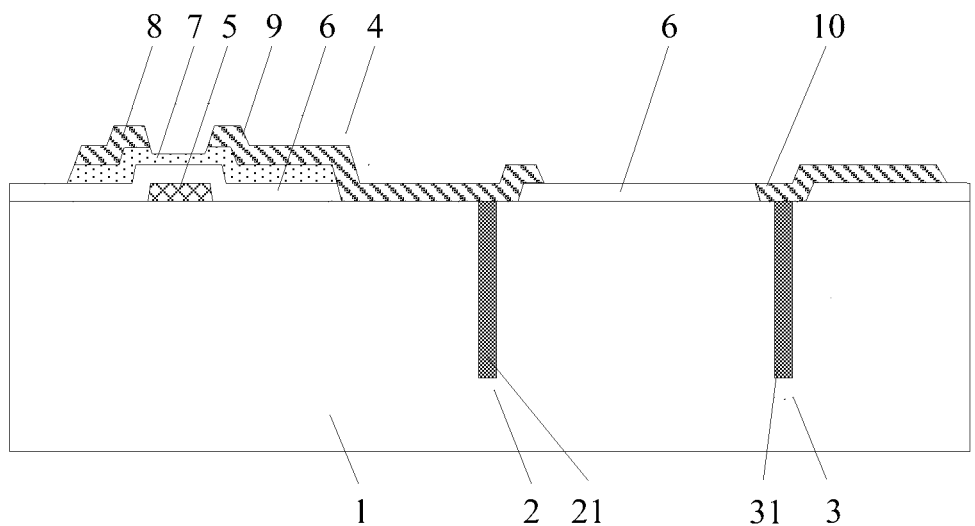
FIG. 17 is a schematic diagram of forming a source electrode and a drain electrode of the thin-film transistor, and a common electrode line in the embodiment of the present disclosure.

Step 9: forming a source-drain metal layer including the source electrode 8 and the drain electrode 9 of the thin film transistor 4 on the active layer 7, the drain electrode 9 of the thin film transistor 4 being electrically connected with the pixel electrode 21; and forming a common electrode line 10 at the same time, the common electrode line 10 being electrically connected with the common electrode 31, as shown in FIG. 17.

For example, the source-drain metal layer can be formed by using a sputtering process, and the source-drain metal layer may be made of a metal such as molybdenum or aluminum and the like.

Step 10: forming a passivation layer 11 on the source-drain metal layer, as shown in FIG. 1.

For example, the passivation layer 11 may be formed by using a plasma enhanced chemical vapor deposition process, and the passivation layer 11 may be made of silicon nitride.

It should be noted that the foregoing is merely for illustrating the present disclosure. The array substrate shown in FIG. 3 may be also fabricated by using the method described above. However, because the first electrode groove 2 and the second electrode groove 3 in FIG. 3 are not perpendicular to the base substrate 1, it is generally difficult to fabricate in this way.

Although the embodiments of the present disclosure have been described above in great detail with general descriptions and specific embodiments, on the basis of the embodiments of the present disclosure, various changes and improvements may be made, which is apparent to those skilled in the art. Therefore, all such changes and improvements without departing from the spirit of the present disclosure are within the scope of the claims of the present disclosure.

The present application claims priority of Chinese Patent Application No. 201510536802.9 filed on Aug. 27, 2015, the present disclosure of which is incorporated herein by reference in its entirety as part of the present application.

The invention claimed is:

1. An array substrate, comprising a base substrate and a plurality of pixel units arranged in matrix on the base substrate, wherein,
a first electrode groove and a second electrode groove separated from each other are arranged in a region of the base substrate corresponding to one of the pixel units, the first electrode groove and the second electrode groove respectively extending from an upper surface of the base substrate towards a lower surface of the base substrate;
the pixel unit includes a pixel electrode and a common electrode, the pixel electrode being arranged in the first electrode groove, and the common electrode being arranged in the second electrode groove.

2. The array substrate according to claim 1, wherein, the first electrode groove and the second electrode groove extend in a direction perpendicular to the upper surface of the base substrate;
sidewalls of the first electrode groove and the second electrode groove facing each other are arranged in parallel.

3. The array substrate according to claim 1, wherein, the first electrode groove and the second electrode groove are arranged opposite to each other, the first electrode groove and the second electrode groove are same in depth;
a transverse distance between the sidewalls of the first electrode groove and the second electrode groove facing each other is reduced with increases of depths of the first electrode groove and the second electrode groove.

4. The array substrate according to claim 1, wherein, the pixel electrode is a planar electrode or a comb-shaped electrode;
the common electrode is a planar electrode or a comb-shaped electrode.

5. The array substrate according to claim 1, wherein, the first electrode groove and the second electrode groove have depths in a range of 1 to 100 μm.

6. The array substrate according to claim 1, wherein, a depth-to-width ratio of the first electrode groove is in a range of 5:1 to 50:1.

7. The array substrate according to claim 1, wherein, the pixel unit further includes a thin film transistor, the thin film transistor including a gate electrode, a gate insulating layer, an active layer, a source electrode and a drain electrode, and the drain electrode of the thin film transistor being electrically connected with the pixel electrode.

8. A display panel, comprising the array substrate according to claim 1.

9. A fabricating method of an array substrate, the array substrate comprising a plurality of pixel units arranged in matrix, the method comprising:
forming a first electrode groove and a second electrode groove in a region of a base substrate corresponding to one of the pixel units, the first electrode groove and the second electrode respectively extending in a direction from an upper surface of the base substrate towards a lower surface of the base substrate; and
forming a pixel electrode in the first electrode groove, and forming a common electrode in the second electrode groove.

10. The method according to claim 9, wherein, forming the first electrode groove and the second electrode groove in the region of the base substrate corresponding to one of the pixel units includes:
forming a mask layer on the base substrate;
forming a photoresist film layer having a pattern on the mask layer, the pattern corresponding to the first electrode groove and the second electrode groove to be formed;
transferring the pattern of the photoresist film layer to the mask layer by a patterning process, and removing the photoresist film layer.

11. The method according to claim 9, further comprising:
sequentially forming a gate metal layer, a gate insulating layer, an active layer, a source electrode, a drain electrode and a passivation layer on the base substrate with the pixel electrode and the common electrode formed thereon;
the drain electrode being electrically connected with the pixel electrode.

12. The array substrate according to claim 2, wherein, the pixel electrode is a planar electrode or a comb-shaped electrode;
the common electrode is a planar electrode or a comb-shaped electrode.

13. The array substrate according to claim 3, wherein, the pixel electrode is a planar electrode or a comb-shaped electrode;
the common electrode is a planar electrode or a comb-shaped electrode.

14. The array substrate according to claim 2, wherein, the first electrode groove and the second electrode groove have depths in a range of 1 to 100 μm.

15. The array substrate according to claim 3, wherein, the first electrode groove and the second electrode groove have depths in a range of 1 to 100 μm.

16. The array substrate according to claim 4, wherein, the first electrode groove and the second electrode groove have depths in a range of 1 to 100 μm.

17. The array substrate according to claim 2, wherein, a depth-to-width ratio of the first electrode groove is in a range of 5:1 to 50:1.

18. The array substrate according to claim 3, wherein, a depth-to-width ratio of the first electrode groove is in a range of 5:1 to 50:1.

19. The array substrate according to claim 4, wherein, a depth-to-width ratio of the first electrode groove is in a range of 5:1 to 50:1.

20. The array substrate according to claim 5, wherein, a depth-to-width ratio of the first electrode groove is in a range of 5:1 to 50:1.

* * * * *